(12) United States Patent
Nongpiur et al.

(10) Patent No.: US 8,150,682 B2
(45) Date of Patent: Apr. 3, 2012

(54) ADAPTIVE FILTER PITCH EXTRACTION

(75) Inventors: Rajeev Nongpiur, Burnaby (CA); Phillip A. Hetherington, Port Moody (CA)

(73) Assignee: QNX Software Systems Limited, Kanata, Ontario (CA)

( * ) Notice: Subject to any disclaimer, the term of this patent is extended or adjusted under 35 U.S.C. 154(b) by 0 days.

(21) Appl. No.: 13/105,612

(22) Filed: May 11, 2011

(65) Prior Publication Data

US 2011/0276324 A1 Nov. 10, 2011

Related U.S. Application Data

(63) Continuation of application No. 11/298,052, filed on Dec. 9, 2005, now Pat. No. 7,949,520, which is a continuation-in-part of application No. 10/973,575, filed on Oct. 26, 2004, now Pat. No. 7,680,652.

(51) Int. Cl.
*G10L 11/04* (2006.01)

(52) U.S. Cl. ... 704/207; 375/230; 375/232; 375/240.25; 704/200.1; 704/209; 704/222; 704/226; 704/228; 704/230; 704/267; 704/500; 708/300; 708/322

(58) Field of Classification Search .................. 375/230, 375/232, 240.25; 704/200.1, 205, 207, 209, 704/220, 222, 225, 226, 228, 230, 267, 500; 708/300, 322
See application file for complete search history.

(56) References Cited

U.S. PATENT DOCUMENTS

| | | | |
|---|---|---|---|
| 4,238,746 A | 12/1980 | McCool et al. | |
| 4,282,405 A | 8/1981 | Taguchi | |
| 4,486,900 A | 12/1984 | Cox et al. | |
| 4,531,228 A | 7/1985 | Noso et al. | |
| 4,628,156 A | 12/1986 | Irvin | |
| 4,630,305 A | 12/1986 | Borth et al. | |
| 4,731,846 A | 3/1988 | Secrest et al. | |
| 4,791,390 A | 12/1988 | Harris et al. | |
| 4,811,404 A | 3/1989 | Vilmur et al. | |
| 4,843,562 A | 6/1989 | Kenyon et al. | |
| 4,939,685 A | 7/1990 | Feintuch | |
| 4,969,192 A * | 11/1990 | Chen et al. | 704/222 |

(Continued)

FOREIGN PATENT DOCUMENTS

CA 2158847 9/1994

(Continued)

OTHER PUBLICATIONS

Anderson C.M., et al: "Adaptive Enhancement of Finite Bandwidth Signals in White Gaussian Noise", *IEEE Trans. On Acoustics, Speech and Signal Processing*, vol. ASSP-31, No. 1, Feb. 1983, pp. 17-28.

(Continued)

*Primary Examiner* — Richemond Dorvil
*Assistant Examiner* — Michael Colucci
(74) *Attorney, Agent, or Firm* — Brinks Hofer Gilson & Lione

(57) ABSTRACT

An enhancement system extracts pitch from a processed speech signal. The system estimates the pitch of voiced speech by deriving filter coefficients of an adaptive filter and using the obtained filter coefficients to derive pitch. The pitch estimation may be enhanced by using various techniques to condition the input speech signal, such as spectral modification of the background noise and the speech signal, and/or reduction of the tonal noise from the speech signal.

20 Claims, 7 Drawing Sheets

U.S. PATENT DOCUMENTS

| | | | |
|---|---|---|---|
| 5,027,410 | A | 6/1991 | Williamson et al. |
| 5,056,150 | A | 10/1991 | Yu et al. |
| 5,146,539 | A | 9/1992 | Doddington et al. |
| 5,278,780 | A * | 1/1994 | Eguchi ............... 708/322 |
| 5,313,555 | A | 5/1994 | Kamiya |
| 5,377,276 | A | 12/1994 | Terai et al. |
| 5,400,409 | A | 3/1995 | Linhard |
| 5,406,622 | A | 4/1995 | Silverberg et al. |
| 5,412,735 | A | 5/1995 | Engebretson et al. |
| 5,432,859 | A | 7/1995 | Yang et al. |
| 5,459,813 | A * | 10/1995 | Klayman ............... 704/209 |
| 5,473,702 | A | 12/1995 | Yoshida et al. |
| 5,479,517 | A | 12/1995 | Linhard |
| 5,494,886 | A | 2/1996 | Kehne et al. |
| 5,495,415 | A | 2/1996 | Ribbens et al. |
| 5,502,688 | A | 3/1996 | Recchione et al. |
| 5,526,466 | A | 6/1996 | Takizawa |
| 5,568,559 | A | 10/1996 | Makino |
| 5,572,262 | A | 11/1996 | Ghosh |
| 5,584,295 | A | 12/1996 | Muller et al. |
| 5,590,241 | A | 12/1996 | Park et al. |
| 5,615,298 | A * | 3/1997 | Chen ............... 704/228 |
| 5,617,508 | A | 4/1997 | Reaves |
| 5,641,931 | A | 6/1997 | Ogai et al. |
| 5,677,987 | A | 10/1997 | Seki et al. |
| 5,680,508 | A | 10/1997 | Liu |
| 5,692,104 | A | 11/1997 | Chow et al. |
| 5,701,344 | A | 12/1997 | Wakui |
| 5,714,997 | A | 2/1998 | Anderson |
| 5,742,694 | A | 4/1998 | Eatwell |
| 5,819,215 | A * | 10/1998 | Dobson et al. ............... 704/230 |
| 5,845,243 | A * | 12/1998 | Smart et al. ............... 704/200.1 |
| 5,864,798 | A * | 1/1999 | Miseki et al. ............... 704/225 |
| 5,920,840 | A * | 7/1999 | Satyamurti et al. ............... 704/267 |
| 5,920,848 | A | 7/1999 | Schutzer et al. |
| 5,933,801 | A | 8/1999 | Fink et al. |
| 5,949,886 | A | 9/1999 | Nevins et al. |
| 5,949,888 | A | 9/1999 | Gupta et al. |
| 5,953,694 | A | 9/1999 | Pillekamp |
| 6,011,853 | A | 1/2000 | Koski et al. |
| 6,084,907 | A * | 7/2000 | Nagano et al. ............... 375/230 |
| 6,104,992 | A * | 8/2000 | Gao et al. ............... 704/220 |
| 6,111,957 | A | 8/2000 | Thomasson |
| 6,144,336 | A | 11/2000 | Preston et al. |
| 6,163,608 | A | 12/2000 | Romesburg et al. |
| 6,167,375 | A | 12/2000 | Miseki et al. |
| 6,173,074 | B1 | 1/2001 | Russo |
| 6,175,602 | B1 | 1/2001 | Gustafson et al. |
| 6,188,979 | B1 * | 2/2001 | Ashley ............... 704/205 |
| 6,192,134 | B1 | 2/2001 | White et al. |
| 6,199,035 | B1 | 3/2001 | Lakaniemi et al. |
| 6,219,418 | B1 | 4/2001 | Eriksson et al. |
| 6,249,275 | B1 | 6/2001 | Kodama |
| 6,282,430 | B1 | 8/2001 | Young |
| 6,405,168 | B1 | 6/2002 | Bayya et al. |
| 6,408,273 | B1 | 6/2002 | Quagliaro et al. |
| 6,434,246 | B1 | 8/2002 | Kates et al. |
| 6,473,409 | B1 | 10/2002 | Malvar |
| 6,493,338 | B1 | 12/2002 | Preston et al. |
| 6,498,811 | B1 | 12/2002 | Van Der Vleuten |
| 6,507,814 | B1 * | 1/2003 | Gao ............... 704/220 |
| 6,587,816 | B1 * | 7/2003 | Chazan et al. ............... 704/207 |
| 6,628,781 | B1 | 9/2003 | Grundström et al. |
| 6,633,894 | B1 | 10/2003 | Cole |
| 6,643,619 | B1 | 11/2003 | Linhard et al. |
| 6,687,669 | B1 | 2/2004 | Schrögmeier et al. |
| 6,690,681 | B1 | 2/2004 | Preston et al. |
| 6,725,190 | B1 | 4/2004 | Chazan et al. |
| 6,771,629 | B1 | 8/2004 | Preston et al. |
| 6,782,363 | B2 | 8/2004 | Lee et al. |
| 6,804,640 | B1 * | 10/2004 | Weintraub et al. ............... 704/226 |
| 6,822,507 | B2 | 11/2004 | Buchele |
| 6,836,761 | B1 | 12/2004 | Kawashima et al. |
| 6,859,420 | B1 | 2/2005 | Coney et al. |
| 6,871,176 | B2 | 3/2005 | Choi et al. |
| 6,891,809 | B1 | 5/2005 | Ciccone et al. |
| 6,898,293 | B2 | 5/2005 | Kaulberg |
| 6,910,011 | B1 | 6/2005 | Zakarauskas |
| 6,937,978 | B2 * | 8/2005 | Liu ............... 704/228 |
| 7,020,291 | B2 | 3/2006 | Buck et al. |
| 7,117,149 | B1 | 10/2006 | Zakarauskas |
| 7,146,012 | B1 | 12/2006 | Belt et al. |
| 7,146,316 | B2 | 12/2006 | Alves |
| 7,167,516 | B1 * | 1/2007 | He ............... 375/232 |
| 7,167,568 | B2 | 1/2007 | Malvar et al. |
| 7,206,418 | B2 | 4/2007 | Yang et al. |
| 7,231,347 | B2 | 6/2007 | Zakarauskas |
| 7,269,188 | B2 | 9/2007 | Smith |
| 7,272,566 | B2 * | 9/2007 | Vinton ............... 704/500 |
| 2001/0005822 | A1 | 6/2001 | Fujii et al. |
| 2001/0028713 | A1 | 10/2001 | Walker |
| 2002/0052736 | A1 | 5/2002 | Kim et al. |
| 2002/0071573 | A1 | 6/2002 | Finn |
| 2002/0176589 | A1 | 11/2002 | Buck et al. |
| 2003/0040908 | A1 | 2/2003 | Yang et al. |
| 2003/0093265 | A1 | 5/2003 | Xu et al. |
| 2003/0093270 | A1 | 5/2003 | Domer |
| 2003/0097257 | A1 | 5/2003 | Amada et al. |
| 2003/0101048 | A1 | 5/2003 | Liu |
| 2003/0206640 | A1 | 11/2003 | Malvar et al. |
| 2003/0216907 | A1 | 11/2003 | Thomas |
| 2004/0002856 | A1 | 1/2004 | Bhaskar et al. |
| 2004/0024600 | A1 | 2/2004 | Hamza et al. |
| 2004/0071284 | A1 | 4/2004 | Abutalebi et al. |
| 2004/0078200 | A1 | 4/2004 | Alves |
| 2004/0138882 | A1 | 7/2004 | Miyazawa |
| 2004/0165736 | A1 | 8/2004 | Hetherington et al. |
| 2004/0167777 | A1 | 8/2004 | Hetherington et al. |
| 2004/0179610 | A1 * | 9/2004 | Lu et al. ............... 375/240.25 |
| 2005/0075866 | A1 | 4/2005 | Widrow |
| 2005/0114128 | A1 | 5/2005 | Hetherington et al. |
| 2005/0240401 | A1 | 10/2005 | Ebenezer |
| 2006/0034447 | A1 | 2/2006 | Alves et al. |
| 2006/0056502 | A1 * | 3/2006 | Callicotte et al. ............... 375/232 |
| 2006/0074646 | A1 | 4/2006 | Alves et al. |
| 2006/0089958 | A1 | 4/2006 | Giesbrecht et al. |
| 2006/0089959 | A1 * | 4/2006 | Nongpiur et al. ............... 708/300 |
| 2006/0100868 | A1 | 5/2006 | Hetherington et al. |
| 2006/0115095 | A1 | 6/2006 | Giesbrecht et al. |
| 2006/0116873 | A1 | 6/2006 | Hetherington et al. |
| 2006/0251268 | A1 | 11/2006 | Hetherington et al. |
| 2006/0287859 | A1 | 12/2006 | Hetherington et al. |
| 2007/0033031 | A1 | 2/2007 | Zakarauskas |
| 2007/0136055 | A1 | 6/2007 | Hetherington |

FOREIGN PATENT DOCUMENTS

| | | |
|---|---|---|
| CA | 2157496 | 10/1994 |
| CA | 2158064 | 10/1994 |
| EP | 0 076 687 A1 | 4/1983 |
| EP | 0 275 416 | 7/1988 |
| EP | 0 558 312 A1 | 9/1993 |
| EP | 0 629 996 A2 | 12/1994 |
| EP | 0 629 996 A3 | 12/1994 |
| EP | 0 750 291 A1 | 12/1996 |
| EP | 0 948 237 A2 | 10/1999 |
| EP | 1 450 353 A1 | 8/2004 |
| EP | 1 450 354 A1 | 8/2004 |
| EP | 1 669 983 A1 | 6/2006 |
| JP | 06269084 A2 | 9/1994 |
| JP | 06319193 A | 11/1994 |
| WO | WO 0041169 A1 | 7/2000 |
| WO | WO 0156255 A1 | 8/2001 |
| WO | WO 0173761 A1 | 10/2001 |
| WO | WO 2006/130668 A2 | 12/2006 |

OTHER PUBLICATIONS

Avendano, C., Hermansky, H., "Study on the Dereverberation of Speech Based on Temporal Envelope Filtering," Proc. ICSLP '96, pp. 889-892, Oct. 1996.

Berk et al., "Data Analysis with Microsoft Excel", Duxbury Press, 1998, pp. 236-239 and 256-259.

Bilcu, et al., "A New Variable Length LMS Algorithm: Theoretical Analysis and Implementations", 2002 IEEE, pp. 1031-1034.

Byun K.J., et al: "Noise Whitening-Based Pitch Detection for Speech Highly Corrupted by Colored Noise", *ETRI Journal*, vol. 25, No. 1, Feb. 2003, pp. 49-51.

Campbell D.A., et al: "Dynamic Weight Leakage for LMS Adaptive Linear Predictors", *Tencon '96 Proceedings*, 1996 IEEE Tencon Digital Signal Processing Applications Perth, WA, Australia Nov. 26-29, 1996, NY, NY, USA, IEEE, US, vol. 2, Nov. 26, 1996, pp. 574-579.

Chang J.H., et al: "Pitch Estimation of Speech Signal Based on Adaptive Lattice Notch Filter", *Signal Processing*, Elsevier Science Publishers B.V. Amsterdam, NL, vol. 85, No. 3, Mar. 2005, pp. 637-641.

Fiori, S., Uncini, A., and Piazza, F., "Blind Deconvolution by Modified Bussgang Algorithm," Dept. of Electronics and Automatics—University of Ancona (Italy), ISCAS 1999.

Ismo Kauppinen, "Methods for Detecting Impulsive Noise in Speech and Audio Signals", pp. 967-970, IEEE 2002.

Kang, Hae-Dong; "Voice Enhancement Using a Single Input Adaptive Noise Elimination Technique Having a Recursive Time-Delay Estimator", Kyungbook National University (Korea), Doctoral Thesis, Dec. 31, 1993, pp. 11-26.

Koike, Shiin'ichi, "Adaptive Threshold Nonlinear Algorithm for Adaptive Filters with Robustness Against Impulse Noise," 1996, IEEE, NEC Corporation, Tokyo 108-01, pp. 1644-1647.

Learned, R.E. et al., A Wavelet Packet Approach to Transient Signal Classification, Applied and Computational Harmonic Analysis, Jul. 1995, pp. 265-278, vol. 2, No. 3, USA, XP 000972660. ISSN: 1063-5203. Abstract.

Nakatani, T., Miyoshi, M., and Kinoshita, K., "Implementation and Effects of Single Channel Dereverberation Based on the Harmonic Structure of Speech," Proc. Of IWAENC-2003, pp. 91-94, Sep. 2003.

Nascimento, Vitor H., "Improving the Initial Convergence of Adaptive Filters" Variable-Length LMS Algorithms, 2002 IEEE, pp. 667-670.

Pornimitkul, Pradya et al., 2102797 Statistic Digital Signal Processing, Comparison of NLMS and RLS for Acoustic Echo Cancellation (AEC) and White Gaussian Noise (WGN), Department of Electrical Engineering Faculty of Engineering, 2002, pp. 1-19.

Puder, H. et al., "Improved Noise Reduction for Hands-Free Car Phones Utilizing Information on a Vehicle and Engine Speeds", Sep. 4-8, 2000, pp. 1851-1854, vol. 3, XP009030255, 2000. Tampere, Finland, Tampere Univ. Technology, Finland Abstract.

Quatieri, T.F. et al., Noise Reduction Using a Soft-Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.

Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.

Rabiner L.R., et al: "A Comparative Performance Study of Several Pitch Detection Algorithms", *IEEE Trans. On Acoustics, Speech and Signal Processing*, vol. ASSP-24, No. 5, Oct. 1976, pp. 399-418.

Saeed V. Vaseghi and Peter J.W. Rayner, "The Effects of Non-Stationary Signal Characteristics on the Performance of Adaptive Audio Restoration System", pp. 377-380, IEEE 1989.

Sasaoka N, et al: "A New Noise Reduction System Based on ALE and Noise Reconstruction Filter", *Circuits and Systems*, 2005. ISCAS 2005. IEEE International Symposium on Kobe, Japan May 23-26, 2005, Piscataway, NJ USA, IEEE May 23, 2005, pp. 272-275.

Seely, S., "An Introduction to Engineering Systems", Pergamon Press Inc., 1972, pp. 7-10.

Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.

Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.

Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.

Tam, et al., "Highly Oversampled Subband Adaptive Filters for Noise Cancellation on a Low-resource DSP System," Proc. Of Int. Conf. on Spoken Language Processing (ICSLP), Sep. 2002, pp. 1-4.

Viera, J., "Automatic Estimation of Reverberation Time," Audio Engineering Society, Convention Paper 6107, 116$^{th}$ Convention, May 8-11, 2004, Berlin, Germany, pp. 1-7.

Wahab A. et al., "Intelligent Dashboard With Speech Enhancement", Information, Communications, and Signal Processing, 1997. ICICS, Proceedings of 1997 International Conference on Singapore, Sep. 9-12, 1997, New York, NY, USA, IEEE, pp. 993-997.

Widrow, B. et al., "Adaptive Noise Cancelling: Principles and Applications" 1975, IEEE, vol. 63, No. 13, New York, pp. 1692-1716.

Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.

\* cited by examiner

ADAPTIVE FILTER PITCH EXTRACTION

PRIORITY CLAIM

This application is a continuation of U.S. application Ser. No. 11/298,052, filed Dec. 9, 2005, now U.S. Pat. No. 7,979,520 which is a continuation-in-part of U.S. application Ser. No. 10/973,575, filed Oct. 26, 2004 now U.S. Pat. No. 7,680,652. The disclosures of the above-identified applications are incorporated herein by reference.

BACKGROUND OF THE INVENTION

1. Technical Field

This invention relates to signal processing systems, and more particularly to systems that estimate pitch.

2. Related Art

Some audio processing systems capture sound, reproduce sound, and convey sound to other devices. In some environments, unwanted components may reduce the clarity of a speech signal. Wind, engine noise and other background noises may obscure the signal. As the noise increases, the intelligibility of the speech may decrease.

Many speech signals may be classified into voiced and unvoiced. In the time domain, unvoiced segments display a noise like structure. Little or no periodicity may be apparent. In the speech spectrum, voiced speech segments have almost a periodic structure.

Some natural speech has a combination of a harmonic spectrum and a noise spectrum. A mixture of harmonics and noise may appear across a large bandwidth. Non-stationary and/or varying levels of noise may be highly objectionable especially when the noise masks voiced segments and non-speech intervals. While the spectral characteristics of non-stationary noise may not vary greatly, its amplitude may vary drastically.

To facilitate reconstruction of a speech signal having voiced and unvoiced segments, it may be necessary to estimate the pitch of the signal during the voiced speech. Accurate pitch estimations may improve the perceptual quality of a processed speech segment. Therefore, there is a need for a system that facilitates the extraction of pitch from a speech signal.

SUMMARY

A system extracts pitch from a speech signal. The system estimates the pitch in voiced speech by enhancing the signal by deriving adaptive filter coefficients, and estimating pitch using the derived coefficients.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Enhancement logic improves the perceptual quality of a processed speech signal. The logic may automatically identify and enhance speech segments. Selected voiced and/or unvoiced segments may be processed and amplified in one or more frequency bands. To improve perceptual quality, the pitch of the signal is estimated. The versatility of the system allows the enhancement logic to enhance speech before it is passed or processed by a second system. In some applications, speech or other audio signals may be passed to remote, local, or mobile system such as an automatic speech recognition engine that may capture and extract voice in the time and/or frequency domains.

The enhancement systems may interface or comprise a unitary part of a vehicle or a communication system (e.g., a wireless telephone, an automatic speech recognition system, etc). The systems may include preprocessing logic and/or post-processing logic and may be implemented in hardware and/or software. In some systems, software is processed by a digital signal processor (DSP), general purpose processor (GPP), or some combination of DSP and GPP. The DSP may execute instructions that delay an input signal, track frequency components of a signal, filter a signal, and/or reinforce selected spectral content. In other systems, the hardware or software may be programmed or implemented in discrete logic or circuitry, a combination of discrete and integrated logic or circuitry, and/or may be distributed across and executed by multiple controllers or processors.

The system for estimating the pitch in a speech signal approximates the position of peaks, k, of the signal. The pitch may be estimated by equation 1:

$$fp = fs/(D+k) \qquad \text{Equation 1}$$

where fp is the estimated pitch, fs is the sampling frequency, the signal has been delayed by D samples before passing through an adaptive filter, and k is a peak position of the adaptive filter coefficients.

Figure 1:
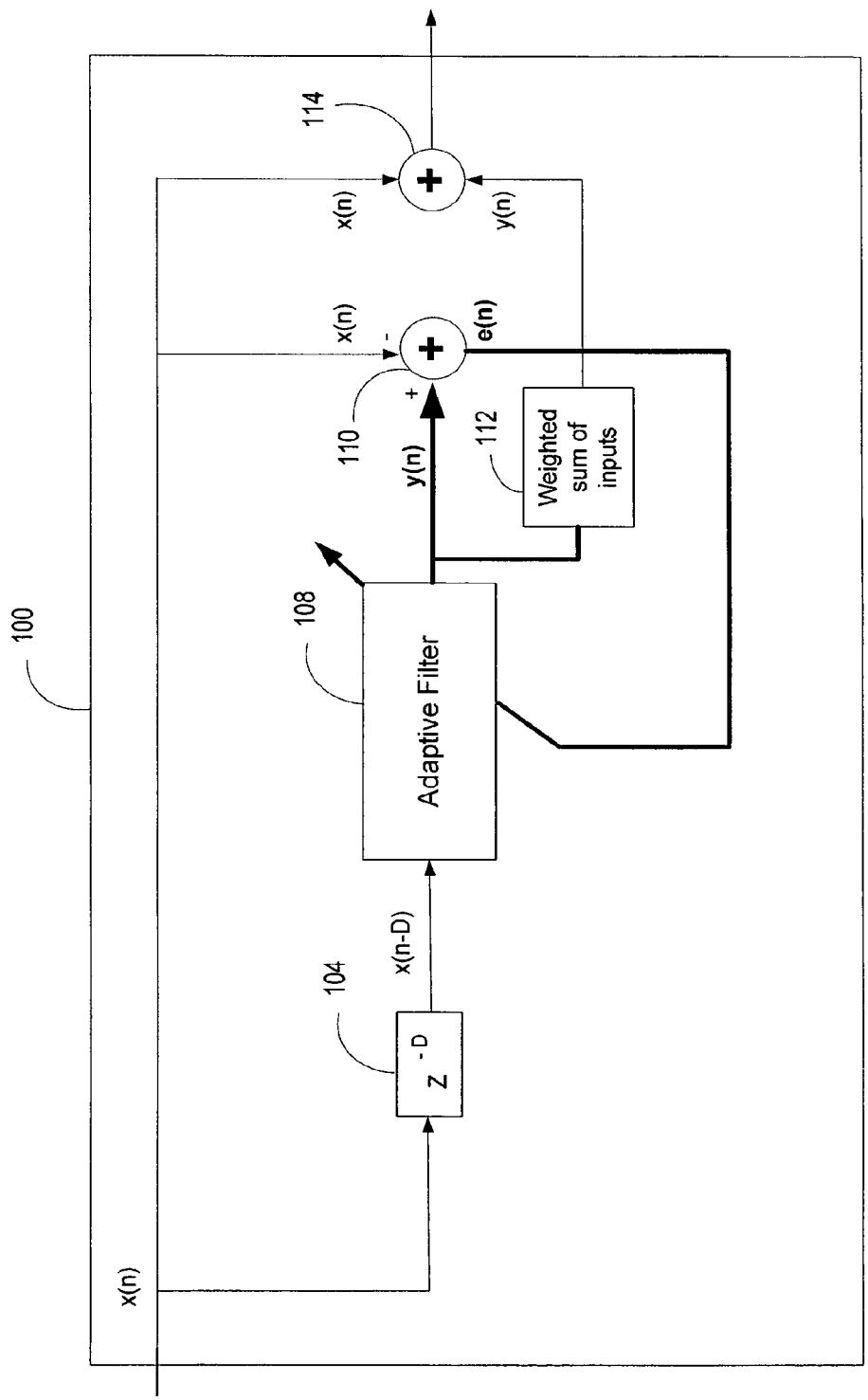
FIG. 1 is a block diagram of a speech signal enhancement system.

In FIG. 1, an adaptive filter enhances the periodic component of speech signal "x(n)". The periodic component of the signal relates to voiced speech. The enhancement system 100 of FIG. 1 processes a signal input "x(n)". The input signal "x(n)" is coupled to delay unit 104. The delay unit 104 imparts a delay. The delay may vary with the implementation of the enhancement system 100 and comprise a portion of a memory or buffer that temporarily holds data to be transferred to another location for a defined or programmable period. In FIG. 1, input "x(n)" is coupled to the adaptive filter 108.

The adaptive filter 108 passes output signal "y(n)". The adaptive filter 108 may track one or more frequency components of the input signal based on the delayed input signal. The filter 108 tracks the fundamental frequencies of the input signal as the pitch changes during voiced speech. The filter 108 may comprise a Finite Impulse Response Filter (FIR) adapted by a Normalized Least Mean Squares (NLMS) technique or other adaptive filtering technique such as Recursive Least Squares (RLS) or Proportional NLMS.

In some enhancement systems the adaptive filter 108 changes or adapts its coefficients to match or approximate the response of the input signal "x(n)". Using an adaptive filtering algorithm, the error signal "e(n)" is derived through adder logic or an adder circuit 110 (e.g., a vector adder) that subtracts the input signal "x(n)" from the adapted predicted output vector "y(n)". As shown in equation 2:

$$\text{vector } e(n) = \text{vector } y(n) - x(n) \quad \text{Equation 2}$$

Using this measure, the adaptive filter 108 changes its coefficients in attempt to reduce the difference between the adapted predicted output vector "y(n)" and the discrete input signal "x(n)."

The adaptive filter output 108, "y(n)", is processed by weighting logic or a weighting circuit 112 to yield a scalar output. In FIG. 1, the weighting logic or circuit 112 may comprise a summing filter that removes the negative coefficients of the predictive output vector "y(n)" before summing the coefficients to derive a scalar output. The scalar output is then added to the input signal through adder logic or an adder circuit 114 (e.g., a scalar adder). To minimize enhancing high frequency components of the input or discrete input "x(n)", a front-end process, circuit(s), processor(s), controller(s) or interface may further condition the delayed input in other communication systems and/or enhancement systems.

When a speech signal "x(n)" is enhanced, the filter coefficients of adaptive filter 108 approximate the autocorrelation values of the speech signal. Therefore, these filter coefficients obtained by adaptive filter 108 may be used to estimate the pitch in voiced speech.

Figure 2:
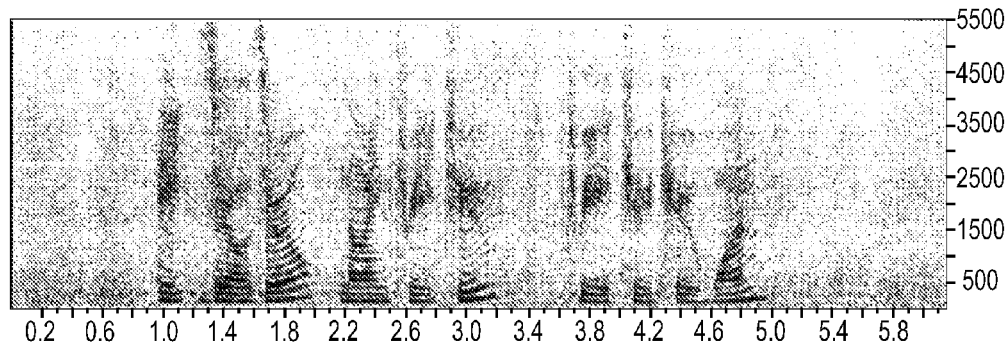
FIG. 2 is a spectral plot of a speech waveform.

FIG. 2 shows a spectral plot of a speech waveform. In this figure, the spectrogram shows the frequency content of the word utterances in speech as a function of time, in seconds. The stronger the frequency component, the darker the shade in the spectrogram. As seen, the word utterances typically have striations. These striations comprise the harmonics of speech, which are multiples of pitch frequency.

Figure 3:
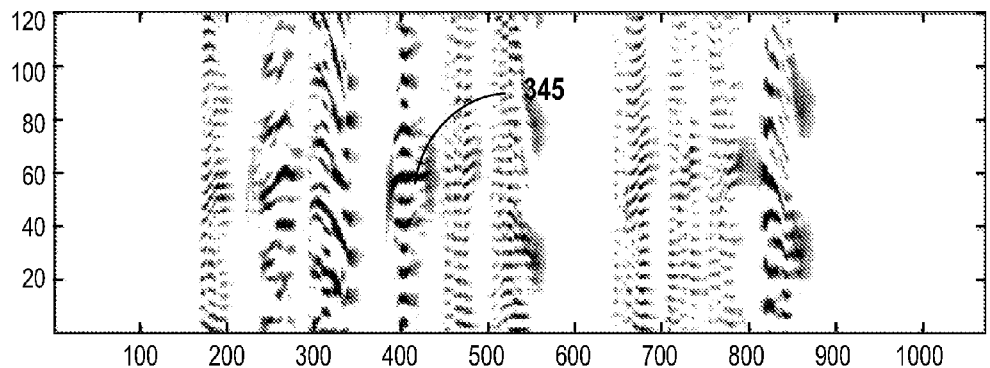
FIG. 3 is a plot of adaptive filter coefficients adapted to the waveform of FIG. 2.
Figure 4:
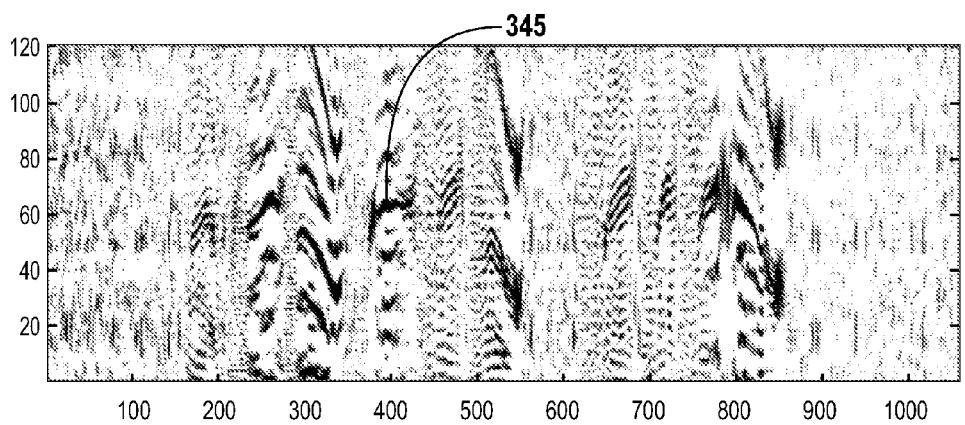
FIG. 4 is a plot of the autocorrelation values of the waveform of FIG. 2.

FIG. 3 shows a plot of the adaptive filter coefficients as they adapt to the speech waveform of FIG. 2. In FIG. 4, a plot of the autocorrelation values of the speech waveform is shown. Both FIGS. 3 and 4 have been substantially time-aligned with FIG. 2 for illustrative purposes. In FIGS. 3 and 4, the numbers shown on the x-axis correspond to the number of frames, wherein each frame is approximately 5.8 ms. In FIG. 3, frame number 400 corresponds to a time of 2.32 seconds in FIG. 2.

In FIG. 3, the y-axis represents the filter coefficients of adaptive filter 108, while in FIG. 4 the y-axis represents the lag-value of the autocorrelation of the speech signal. Specifically, FIG. 3 shows, graphically, the filter coefficients for adaptive filter 108, which for this example ranges from 1 to 120. A filter coefficient of 1 may represent the first filter coefficient of adaptive filter 108. In FIG. 3, each filter coefficient changes with time because error feedback "e(n)" of FIG. 1 continuously adapts the filter coefficient values.

The periodic components of input signal "x(n)" form substantially organized regions on the plot. The periodic components of the signal contribute to larger peak values in the filter coefficients of the adaptive filter, while the background noise and non-periodic components of speech do not contribute to large filter coefficients values. By using FIG. 2, which has been time-aligned with FIG. 3, to identify the periodic, non-periodic, and silent (that is, only background noise) portions of the speech signal, it may be observed that the filter coefficients in FIG. 3 have relatively small values (i.e., lighter shade) during non-periodic and background-noise-only portions of speech and relatively large peak values (i.e., dark striations) during periodic portions of speech. The dark spot 345 shown in FIG. 3 corresponds to peak filter coefficient values during a periodic segment (or voiced speech segment) of input signal "x(n)."

When the input signal "x(n)" is periodic, the filter coefficient values, which are similar to the autocorrelation function values, may be used to calculate the period of this signal. As expressed in equation 1, the pitch of signal "x(n)" may be approximated by the inverse of the position of the peak filter coefficient. The position of the filter coefficients is analogous to the lag of the autocorrelation function.

For clean speech with relatively low noise, the position of the peak of the filter coefficient values may yield the lag. Taking the inverse of the lag, the pitch frequency may be obtained. For example, in FIG. 3, at frame 400 (or approximately 2.32 seconds), the largest peak occurs at position 60, as shown by dark spot 345. Assuming the signal has not been delayed, e.g., D=0, then the estimated pitch may be calculated as $f_p = f_s/k = (11025 \text{ Hz})/(60) = 184$ Hz.

The adaptive filter coefficients shown in FIG. 3 are updated on a sample-by-sample basis, while the autocorrelation values of FIG. 4 are updated on a block-by-block basis. By updating the filter coefficients on a sample-by-sample basis, enhanced identification of filter coefficient peaks and improved pitch estimation in the speech sample may be achieved. Improving resolution yields an improved tracking performance of the estimated pitch, particularly where the pitch varies rapidly.

Figure 5:
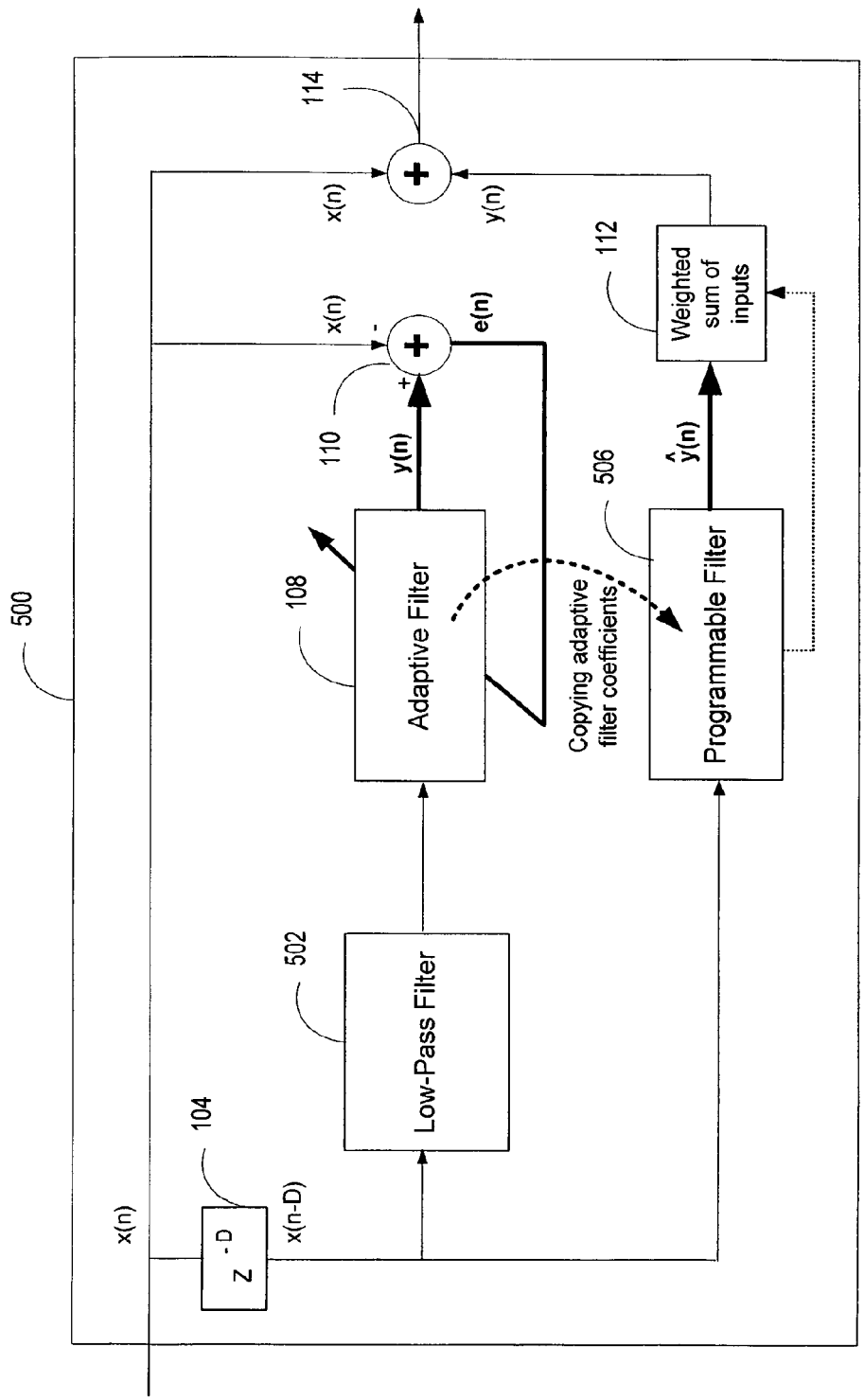
FIG. 5 is a block diagram of a second speech signal enhancement system.

FIG. 5 is a system for obtaining an improved pitch estimate. In speech, the higher frequency harmonics may be stronger than the pitch of the signal. In such cases, these stronger harmonics may cause undesirable multiple peaks to overlap with the peaks caused by the signal at the pitch frequency, thereby making estimation of the desirable peak positions inaccurate. If the estimation of the peak positions is inaccurate, the estimated pitch may be inaccurate.

In FIG. 5, communication or enhancement system 500 comprises low-pass filter 502. The low-pass filter reduces undesirable peaks that may be caused by higher frequency harmonics by changing the frequency spectrum of a delayed signal. The lower frequency noise components may be used to estimate the filter coefficients. Low-pass filter 502 may attenuate frequencies above a predefined threshold, for example, about 1,000 Hz. By filtering out high frequency values from input signal "x(n)", more accurate filter coefficients may be obtained. The more accurate filter coefficients may yield an improved pitch estimate.

In operation, signal "x(n)" is passed through low-pass filter 502 before passing to adaptive filter 108. Digital delay unit 104 couples the input signal "x(n)" to the low-pass filter 502 and a programmable filter 506 that may have a single input and multiple outputs. While the system encompasses many techniques for choosing the coefficients of the programmable filter 506, in FIG. 5 the programmed filter 506 copies the adaptive filter coefficients from adaptive filter 108. The filter coefficients are copied at substantially the sampling rate of the enhancement system 500. The sampling rate of the enhancement system 500 may vary with a desired resolution of the enhanced speech signal. While the transfer functions of the adaptive filter 108 and programmed filter 506 may change as the amplitude and/or frequency of the input signal "x(n)" or the delayed input signal "x(n–D)" changes, the programmed filter 506 has substantially the same transfer function as the adaptive filter 108 as each sample point of the input signal is processed. Temporally, this may occur at the sampling frequency of the enhancement system 500.

In FIG. 5, portions of the delayed input "x(n–D)" are processed by the programmed to filter 506 to yield a predictive output vector "ŷ(n)". The predictive output vector "ŷ(n)" is then processed by weighting logic or a weighting circuit 112 to yield a scalar output. In FIG. 5, the weighting logic or circuit 112 may comprise a summing filter that removes the negative coefficients of the predictive output vector "ŷ(n)" before summing the coefficients to derive a scalar output. The scalar output then is added to the input signal through an adder logic or an adder circuit 114 (e.g., a scalar adder), which enhances the periodicity or harmonic structure of voiced speech with little or no amplification of the background noise.

Figure 6:
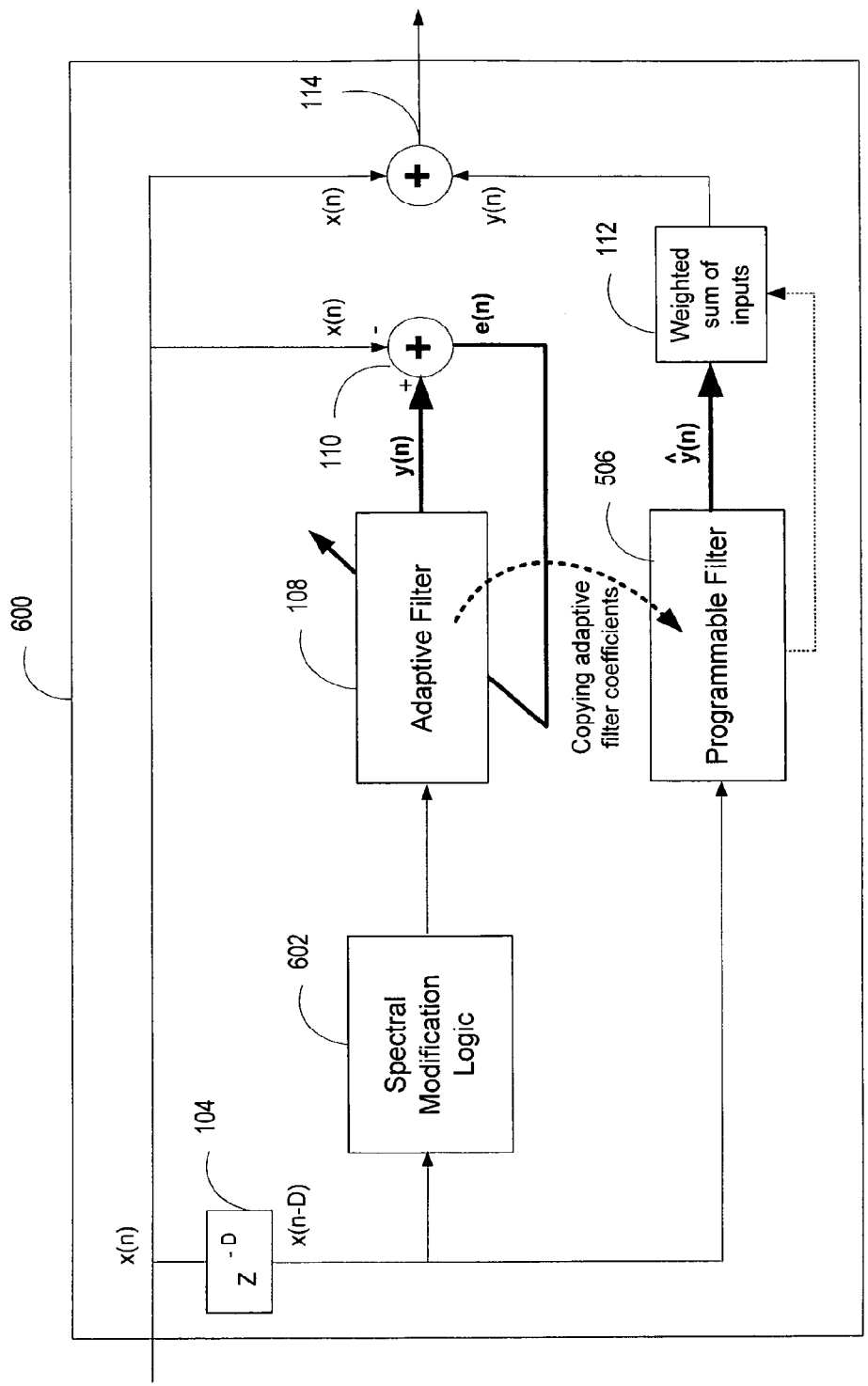
FIG. 6 is a block diagram of a third speech signal enhancement system.

FIG. 6 is another system that improves the pitch estimate in a speech sample. Poor pitch estimates may occur in high-amplitude, low-frequency noise conditions that may be caused by road bumps, wind buffets and car noises. These undesirable noises may prevent the adaptive filter coefficients from converging properly. If the adaptive filter coefficients cannot converge correctly, then the derivation of pitch may be inaccurate.

One technique for improving the convergence rate of the adaptive filter in such conditions is to spectrally flatten the input signal before passing it to the adaptive filter. In FIG. 6, spectral flattening is performed by spectral modification logic 602, before signal "x(n–D)" is passed through adaptive filter 108. Spectral modification logic 602 substantially flattens the spectral character of the background noise within the input "x(n)" or the delayed input "x(n–D)" that may include speech and background noise. In some systems the frequency and/or amplitude of portions of the background noise is detected during talk spurts and pauses. In some applications, the detected noise is modeled by an n-pole linear predictive coding "LPC" filter model, where n can vary between 1 and 20. In these and other systems, some of the background noise is substantially flattened, and in other systems some of the background noise is dampened. The noise may be dampened to a comfort noise level, noise floor, or a predetermined level that a user expects to hear.

Figure 7:
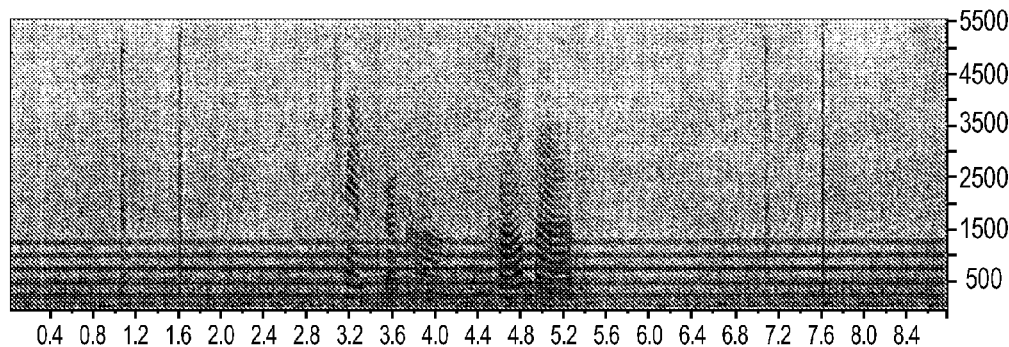
FIG. 7 is a spectral plot of a speech waveform in a tonal noise environment.
Figure 8:
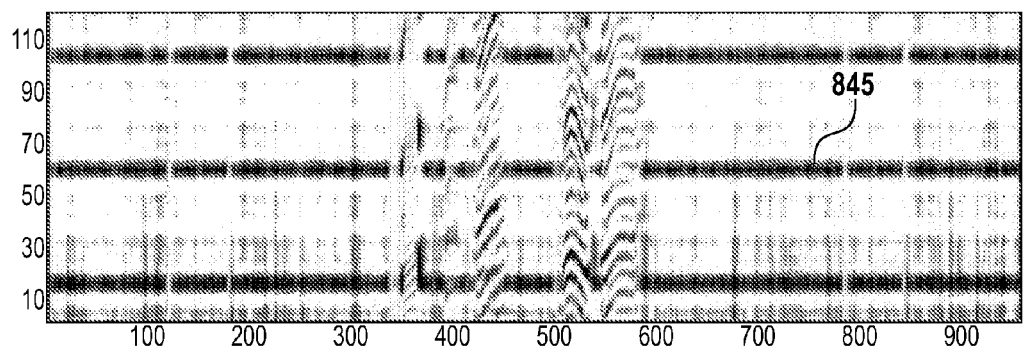
FIG. 8 is a plot of filter coefficients in the tonal noise environment of FIG. 7.
Figure 9:
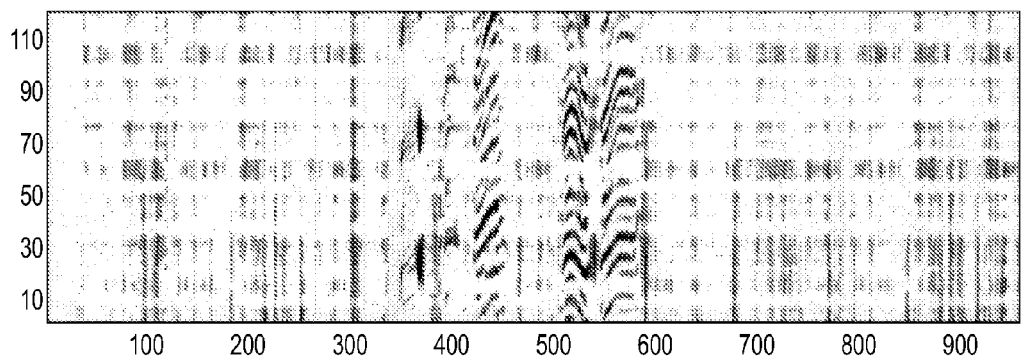
FIG. 9 is a plot of the filter coefficients of FIG. 8 after reducing the effect of tonal noise from the speech.

In FIGS. 7-9, pitch estimation is improved by taking a leaky average of adaptive filter coefficients. If a speech signal is corrupted by a constant tonal noise, the adaptive filter coefficients may also have peaks corresponding to the tonal noise, which may adversely affect the pitch estimate. FIG. 7 shows a spectral plot of a speech waveform. In FIG. 7, a tonal noise masks portions of the speech signal. Specifically, the darker shading in the substantially horizontal lines of the spectrogram shows that an enhancement is amplifying the continuous tonal noise.

A leaky average may be used to reduce the adverse impact of tonal noise on the filter coefficients. The leaky average of the adaptive filter coefficients may be approximated by equation 3:

$$y(n) = (1-\alpha)y(n-1) + \alpha h(n) \qquad \text{Equation 3}$$

where y(n) is the leaky average vector of the filter coefficients, h(n) is the input filter coefficient vector, and α is the leakage factor. By taking a leaky average of the adaptive filter coefficients, tonal noise present in the input signal may be substantially captured. The leaky average of the filter coefficients may then be subtracted from the substantially instantaneous estimate of the adaptive filter coefficients to substantially remove the effect of tonal noise from the estimated adaptive filter coefficients. The leaky average vector obtained from equation 3 corresponds to constant, unwanted tonal noise. Such values may be subtracted from the instantaneous estimate of the adaptive filter coefficients. This subtraction provides for revised filter coefficients that have substantially reduced the effect of tonal noise.

In FIG. 8, a plot of filter coefficients, which have not been enhanced using a leaky average, is shown. Various dark horizontal lines 845 may be seen. These lines correspond to a constant tonal noise, such as engine noise of a vehicle. In estimating the pitch of voiced speech, it may be desirable to remove such lines.

In FIG. 9, the amplitude of the speech signal is improved, with little or no amplification of the continuous interference of the tonal noise. In particular, the constant tonal noise lines 845 have been reduced.

Figure 10:
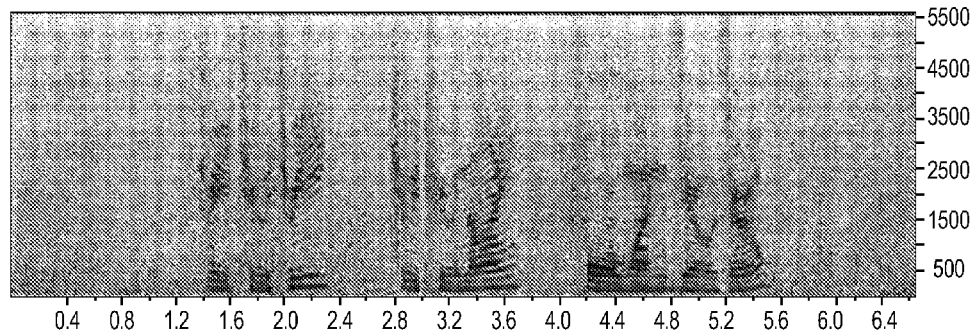
FIG. 10 is a spectral plot of a speech waveform.
Figure 11:
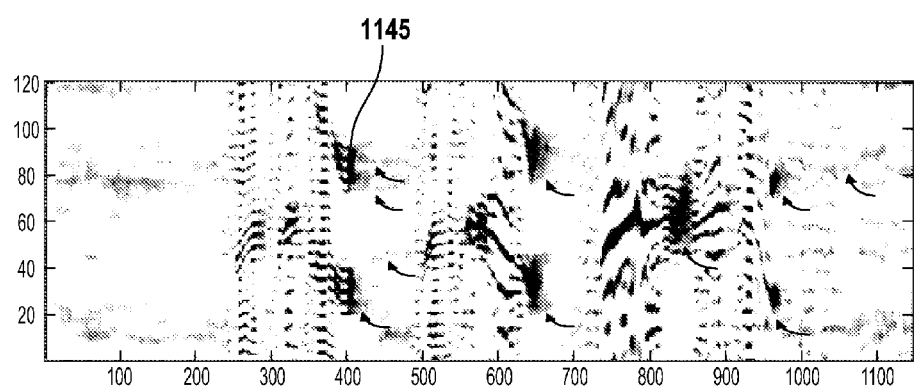
FIG. 11 is a plot of filter coefficients of FIG. 10 with no noise added.
Figure 12:
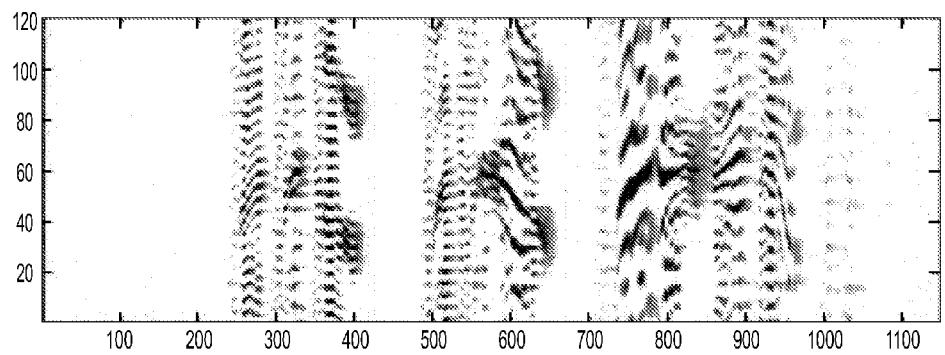
FIG. 12 is a plot of the filter coefficients of FIG. 10 with noise added to the input signal.

In FIGS. 10-12, another technique that enhances the pitch estimation of a speech signal is described. When a speech signal has low noise content, such as when passing through silent portions of speech, the values of the adaptive filter coefficients tend to adhere to the last significant coefficient. This may occur where the magnitude of the speech signal in the silent portions is too weak to cause significant changes to the adaptive filter coefficients. One way to reduce this "adherence effect" by adding a small-magnitude random noise to the reference input signal of the adaptive filter.

FIG. 10 shows a spectral plot of a speech waveform. In FIG. 11, filter coefficients may adhere to the last significant coefficient values while passing through silent portions of the speech waveform. As shown, the dark spot 1145 of FIG. 11 may correspond to an instance where there is a clean signal comprising primarily speech, with little or no noise. After this instance in time, a grey smearing effect may be seen. In particular, the arrows in FIG. 11 depict filter coefficients for which an adherence effect may be present. Since the error signal that adapts to the filter coefficient of the previous value may be carried through a region where there is no speech, the feedback signal may be very small. Such adherence due to low background noise may pose a problem when estimating pitch in a speech signal because the dark speech signal may extend into a region where there is little or no speech.

In FIG. 12, a small amount of background noise has been added to input signal "x(n–D)" of FIGS. 5 and 6, before the signal is passed through adaptive filter 108. A relatively small amount of white noise may be added to the signal. The effect of adding random noise to the input signal "x(n–D)" is shown in FIG. 12. With random noise added, the error signal "e(n)" that is relayed to adaptive filter 108 causes the filter to adapt in regions where there is little or no speech. The smearing effect from FIG. 11 may be substantially reduced.

Figure 13:
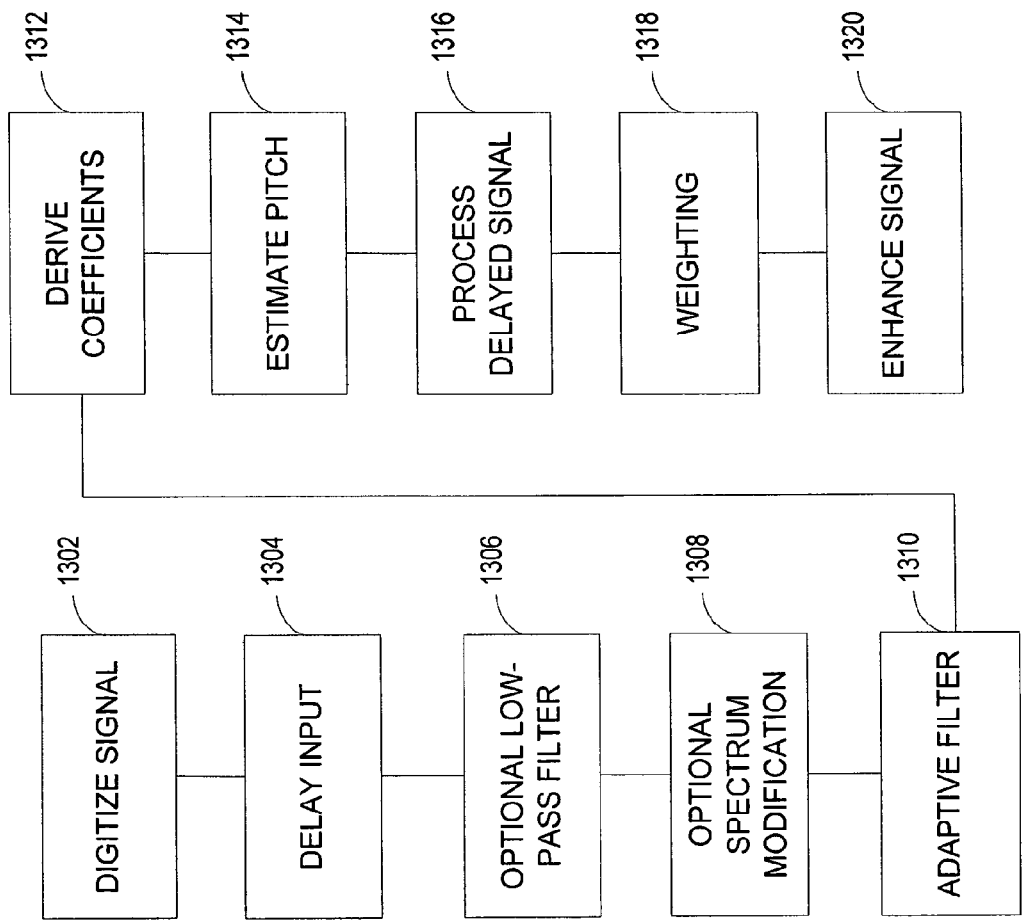
FIG. 13 is a flow diagram of a signal enhancement.

FIG. 13 is a flow diagram of a signal enhancement. An input signal is digitized (Act 1302) and delayed (Act 1304). The delay may be implemented by a memory, buffer, or logic that counts to a specified number before passing the signal or other devices that causes the input signal to reach its destination later in time. In some systems the delay may comprise a propagation delay.

The delayed signal may be passed through a low-pass filter (Act 1306), or may be passed through spectral modification logic (Act 1308). The spectral modification logic substantially flattens the spectral character of all or a portion of the background noise before it is filtered by one or more (e.g., multistage) filters (e.g., a low pass filter, high pass filter, band pass filter, and/or spectral mask) at optional Act 1308. In some methods, the frequency and amplitude of the background noise is detected during talk spurts and pauses and may be modeled by a linear predictive coding filter. In these and other methods, some or all of the background noise is substantially flattened, and in other systems some or all of the background noise is dampened. The noise may be dampened to a comfort noise level, noise floor, or a predetermined level that a user expects to hear.

An adaptive filter such as a moving average filter, nonrecursive discrete-time filter, or adaptive FIR filter may model a portion of the speech spectrum with the flattened or dampened noise spectrum at Act 1310. In some enhancement systems, the adaptive filter changes or adapts its coefficients to match or approximate the input signal "x(n)" at discrete points in time. Using an adaptive filtering algorithm, the error signal "e(n)" is derived to through adder logic or an adder circuit (e.g., a vector adder) that subtracts the input signal "x(n)" from the adapted predicted output vector "y(n)", as shown in equation 2 above.

In FIG. 13, the adaptive filter changes its coefficients as it reduces the difference between the adapted predicted output vector "y(n)" and the discrete input signal "x(n)". Based on the feedback from error signal "e(n)", the adaptive filter coefficients are derived (Act 1312). Based on the adaptive filter coefficients, the pitch of the speech signal is estimated (Act 1314).

At Act 1316, portions of the delayed input "x(n−D)" are processed by the programmed filter to yield a predictive output vector "ŷ(n)". The predictive output vector "ŷ(n)" is then processed by weighting logic or a weighting circuit to yield a scalar output at Act 1318. In FIG. 13, the weighting logic or circuit may comprise a summing filter that removes the negative coefficients of the predictive output vector "ŷ(n)" before summing the coefficients to derive a scalar output. The scalar output is then added to the input signal through adder logic or an adder circuit (e.g., a scalar adder) at Act 1320 which enhances the periodicity or harmonic structure of voiced speech to derive an enhanced speech signal.

The systems provide improved pitch estimation based on the calculated adaptive filter coefficients. The accuracy of the pitch estimate may vary with the pitch value. The accuracy of the pitch estimate from the filter coefficients may be expressed as:

$$\Delta fs = (fp)^2 / fs \qquad \text{Equation 4}$$

where "Δ fs" is the pitch tolerance range, fp is the estimated pitch, and fs is the sampling frequency.

Each of the systems and methods described above may be encoded in a signal bearing medium, a computer readable medium such as a memory, programmed within a device such as one or more integrated circuits, or processed by a controller, a digital signal processor and/or a general purpose processor (GPP). If the methods are performed by software, the software may reside in a memory resident to or interfaced to the spectral modification logic 602, adaptive filter 108, programmed filter 506 or any other type of non-volatile or volatile memory interfaced, or resident to the elements or logic that comprise the enhancement system. The memory may include an ordered listing of executable instructions for implementing logical functions. A logical function may be implemented through digital circuitry, through source code, through analog circuitry, or through an analog source such through an analog electrical, or optical signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any apparatus that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The enhancement system may be modified or adapted to any technology or devices. The above described enhancement systems may couple or interface remote or local automatic speech recognition "ASR" engines. The ASR engines may be embodied in instruments that convert voice and other sounds into a form that may be transmitted to remote locations, such as landline and wireless communication devices (including wireless protocols such as those described in this disclosure) that may include telephones and audio equipment and that may be in a device or structure that transports persons or things (e.g., a vehicle) or stand alone within the devices. Similarly, the enhancement may be embodied in a vehicle with ASR or without ASR.

The ASR engines may be embodied in telephone logic that in some devices are a unitary part of vehicle control system or interface a vehicle control system. The enhancement system may couple pre-processing and post-processing logic, such as that described in U.S. application Ser. No. 10/973,575 "Periodic Signal Enhancement System," filed Oct. 26, 2004, which is incorporated herein by reference. Similarly, all or some of the delay unit, adaptive filter, vector adder, and scalar adder may be modified or replaced by the enhancement system or logic described U.S. application Ser. No. 10/973,575.

The speech enhancement system is also adaptable and may interface systems that detect and/or monitor sound wirelessly or through electrical or optical devices or methods. When certain sounds or interference are detected, the system may enable the enhancement system to prevent the amplification or gain adjustment of these sounds or interference. Through a bus, such as communication bus, a noise detector may send a notice such as an interrupt (hardware of software interrupt) or a message to prevent the enhancement of these sounds or interferences while enhancing some or all of the speech signal. In these applications, the enhancement logic may interface or be incorporated within one or more circuits, logic, systems or methods described in "Method for Suppressing Wind Noise," U.S. Ser. Nos. 10/410,736 and 10/688,802; and "System for Suppressing Rain Noise," U.S. Ser. No. 11/006,935, each of which is incorporated herein by reference.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for estimating pitch, comprising:
    a discrete input configured to receive a speech signal;
    a delay unit coupled with the discrete input and configured to delay the speech signal;
    an adaptive filter coupled with the delay unit and configured to process the speech signal output from the delay unit; and
    a pitch estimator comprising a processor configured to analyze adaptive filter coefficients that define a transfer function of the adaptive filter and estimate a pitch of the speech signal based on the adaptive filter coefficients.

2. The system of claim 1 where the pitch estimator is configured to locate a position of a peak in the adaptive filter coefficients and estimate the pitch of the speech signal based on the position of the peak.

3. The system of claim 1 where the adaptive filter is configured to generate an output signal based on the speech signal received from the delay unit and the adaptive filter coefficients that define the transfer function of the adaptive filter.

4. The system of claim 3 where the adaptive filter is configured to change, on a sample-by-sample basis, the adaptive filter coefficients based on a difference between the output signal and the speech signal received at the discrete input.

5. The system of claim 1 further comprising a low-pass filter coupled between the delay unit and the adaptive filter.

6. The system of claim 1 further comprising spectral modification logic coupled between the delay unit and the adaptive filter.

7. The system of claim 1 further comprising a programmable filter coupled to the delay unit and configured to process the speech signal output from the delay unit, where the programmable filter comprises a transfer function functionally related to the transfer function of the adaptive filter.

8. The system of claim 7 where the adaptive filter coefficients of the adaptive filter are copied to the programmable filter to match the transfer function of the programmable filter with the transfer function of the adaptive filter.

9. The system of claim 1 where the system is configured to add a noise to the speech signal before passing the speech signal through the adaptive filter.

10. The system of claim 1 where the pitch estimator is configured to estimate the pitch of the speech signal according to $f_p=f_s/(D+k)$, where $f_p$ is the estimated pitch of the speech signal, $f_s$ is a sampling frequency, D is a number of samples that the speech signal has been delayed by the delay unit, and k is a position of a peak in the adaptive filter coefficients.

11. A system for estimating pitch, comprising:
    an adaptive filter that comprises adaptive filter coefficients and an input configured to receive a speech signal, where the adaptive filter coefficients define a transfer function of the adaptive filter; and
    a pitch estimator comprising a processor configured to analyze the adaptive filter coefficients and estimate a pitch of the speech signal based on the adaptive filter coefficients.

12. The system of claim 11 where the pitch estimator is configured to locate a position of a peak in the adaptive filter coefficients and estimate the pitch of the speech signal based on the position of the peak.

13. The system of claim 11 where the pitch estimator is configured to estimate the pitch of the speech signal according to $f_p=f_s/(D+k)$, where $f_p$ is the estimated pitch of the speech signal, $f_s$ is a sampling frequency, D is a number of samples that the speech signal has been delayed, and k is a position of a peak in the adaptive filter coefficients.

14. The system of claim 11 where the adaptive filter is configured to generate an output signal based on the speech signal and the adaptive filter coefficients, and where the adaptive filter is configured to change, on a sample-by-sample basis, the adaptive filter coefficients based on a difference between the output signal and the speech signal.

15. A method for estimating pitch, the method comprising:
    receiving a speech signal;
    delaying the speech signal;
    passing the delayed speech signal through an adaptive filter;
    obtaining adaptive filter coefficients that define a transfer function of the adaptive filter; and
    analyzing the adaptive filter coefficients by a processor to estimate a pitch of the speech signal based on the adaptive filter coefficients.

16. The method of claim 15 where analyzing the adaptive filter coefficients to estimate the pitch of the speech signal comprises:
    locating a position of a peak in the adaptive filter coefficients; and
    estimating the pitch of the speech signal based on the position of the peak.

17. The method of claim 15 where analyzing the adaptive filter coefficients to estimate the pitch of the speech signal comprises estimating the pitch of the speech signal according to $f_p=f_s/(D+k)$, where $f_p$ is the estimated pitch of the speech signal, $f_s$ is a sampling frequency, D is a number of samples that the speech signal has been delayed, and k is a position of a peak in the adaptive filter coefficients.

18. The method of claim 15 further comprising:
    generating an output signal from the adaptive filter based on the delayed speech signal and the adaptive filter coefficients that define the transfer function of the adaptive filter; and
    changing, on a sample-by-sample basis, the adaptive filter coefficients based on a difference between the output signal and the speech signal.

19. The method of claim 15 further comprising passing the speech signal through a low-pass filter before passing the signal through the adaptive filter.

20. The method of claim 15 further comprising spectrally flattening the speech signal before passing the signal through the adaptive filter.

* * * * *